Sept. 25, 1928.  
E. B. CARNS  
1,685,119  
LANDING GEAR FOR FLYING MACHINES  
Filed March 31, 1927
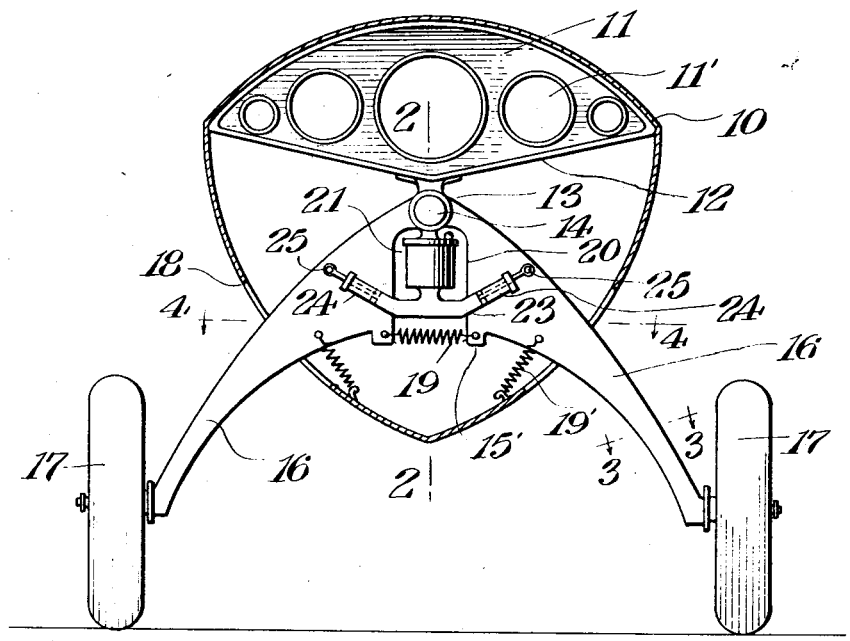
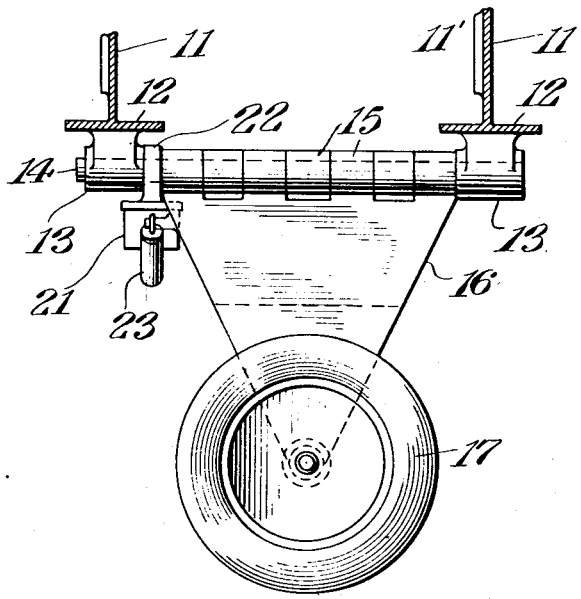
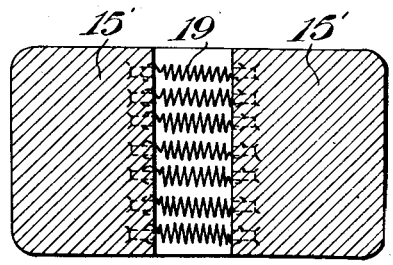
Inventor,
Edmund B. Carns.
By his Attorney,
Ramsay Hoguet.

Patented Sept. 25, 1928.

1,685,119

UNITED STATES PATENT OFFICE.

EDMUND B. CARNS, OF NEW YORK, N. Y.

LANDING GEAR FOR FLYING MACHINES.

Application filed March 31, 1927. Serial No. 179,989.

My invention relates to improvements in landing gear for airplanes and flying machines generally. The invention is particularly adapted for use in connection with a new type of light monocoque airplane of my own invention but it can be applied to flying machines generally.

The object of the invention is to produce a light, strong and simple attachment which can be applied to any usual or preferred type of fuselage and which will enable the machine to alight safely and without excessive shock on a surface which may be rather rough and, in fact, too rough to permit safe landing of a machine having the ordinary running gear.

The invention is further intended to produce a landing gear which will resiliently support the fuselage when running on the ground, and which is pivotally connected with the fuselage above the center of gravity of the latter so that the running gear may be traversing an uneven surface but the fuselage will swing to a level position.

The invention is further intended to produce a landing gear having spreading legs which are pivoted to the fuselage and cushioned against violent action or reaction in either direction, so that as the machine lights the legs will spread under a cushioned resistance and will be prevented from violent reactionary shock, all to the end that the machine may light safely and without damage to itself or injury to its occupants or contents.

My invention is further intended to produce a simple and efficient cushioning means for the leg members of the landing gear and to construct the whole device in a manner to conserve simplicity, strength and lightness.

Reference is to be had to the accompanying drawings in which similar reference characters represent the corresponding parts in all views.

Fig. 1 is a cross-sectional elevation of a fuselage showing my landing gear attached;

Fig. 2 is a broken section on the line 2—2 of Fig. 1;

Fig. 3 is a section through a leg member on the line 3—3 of Fig. 1; and

Fig. 4 is a detail sectional plan on the line 4—4 of Fig. 1.

The fuselage 10 can be of any approved type, but I have shown a fuselage of generally triangular cross section of my own design but this is not essential to the landing gear. As a matter of convenience of attachment the fuselage is provided with transverse bulkheads 11 which are perforated as at 11' for lightness, with the perforations reinforced by a flange as shown. The bulkhead is provided with a flange 12 which runs transversely of the fuselage and is preferably inclined from the center to the top of the side portions of the fuselage and the bulkheads have spaced tubular hangers 13 depending from their apexes and supporting a hinged pintle or shaft 14, on which are pivoted interlocking knuckles 15 of the spreading leg members 16. These leg members, it will be seen by reference to Fig. 1, are arched and extend downward and outward from the fuselage body while the connection with the pintle 14 is above the center of gravity of the fuselage, so that the latter will be hingedly supported, and if the legs are unevenly supported the fuselage will swing to a level position. These legs 16 are of streamline contour, as shown at Fig. 3, and they are preferably hollow for lightness. At their lower ends the legs are shown provided with wheels 17. This would be the ordinary equipment for the legs but it will be understood, of course, that they might be provided with shoes for landing on snow or other surfaces, or with means for landing on water or soft spots. The usual equipment, however, is the wheels. The legs have a vertical movement in slots 18 in the side walls of the fuselage and, if it is found desirable, frictional contact may be made between the slotted walls and the legs. On the underside and near the top, the legs are each provided with a widened or lug portion 15', these parts of the two legs being connected by springs 19 or equivalent expansible cushions so that as the machine lights the impact will cause the legs to spread against the tension of these springs.

For the heavier machines I can use also springs 19' connecting the lugs with the lower end inner part of the fuselage and when the machine lights, these springs will receive and partially absorb the first shock, and thereby make the action and reaction on the springs 19 less violent.

The legs are preferably recessed as shown at 20 at points below the pivot of shaft 14 to provide space for a reservoir 21 for oil or other liquid. This is suspended from the shaft or pintle 14 by a hanger 22 and the reservoir delivers into branching cylinders 23 which are arranged at the right angle to oppose the movement of the legs 16 after they have been spread as above described, and the cylinders act as dash-pots to receive the pistons 24, the shafts of which are pivoted to the legs as shown at 25.

Thus it will be seen that as the machine lights, the first action will be to spread the legs 16 against the tension of the springs 19 and the reaction is against the light pressure in the dash pots 23, so that there can be no violent shock in either direction and as the leg terminals, that is, wheels 17, or equivalents, may strike on rough ground, the rebound absorbed by the dash pots, the shock of alighting will be absorbed in the manner described, and the fuselage will ride level under any conditions where a landing would be attempted.

From the foregoing description it will be readily seen that the landing gear is suitable and strong, easily applied to the fuselage, well adapted to absorb landing shocks, to permit landing on a rough surface and to cause the fuselage to run evenly, even though the surface on which the landing is effected may be uneven.

I claim:

1. A flying machine having a fuselage and branching legs having a common pivot connected to the fuselage above the center of gravity of the fuselage.

2. An aircraft comprising a fuselage, branching legs having a common pivotal connection to the fuselage above its center of gravity, and a yielding resistance against the free spreading of the legs.

3. An aircraft comprising a fuselage, branching legs having a common pivotal connection to the fuselage above its center of gravity, and a yielding resistance to check the movement of the legs, both inwardly or outwardly.

4. An aircraft comprising a fuselage, branching legs pivotally connected with the fuselage, a yielding resistance to check the spreading of the legs, and a dash pot between the legs arrangement to check the inward movement of the legs.

5. A structure of the kind described comprising a fuselage, branching legs pivotally connected with the fuselage, a yielding resistance to check the spreading of the legs, and dash pots suspended between the legs and having their pistons pivotally connected to the legs.

6. In a structure of the kind described, a fuselage with branching legs pivoted to the fuselage, a yielding resistance connecting the legs to check their spreading, and a dash pot arrangement suspended between the legs and connected therewith in a manner to check the inward movement of the legs.

7. In a structure of the kind described, a fuselage, branching legs pivotally connected with the fuselage, said legs being recessed at points below their pivot, a yielding resistance connecting the legs, a reservoir suspended from the pivot so as to hang in the aforesaid recess, and dash pots connected with the reservoir and with the legs in a manner to check the inward movement of the legs.

8. In a structure of the kind described, a fuselage having slotted sides, branching legs pivoted to the fuselage above its center of gravity and extending downward and outward through the said slots, a yielding resistance disposed to check the spreading of the legs, and a second yielding resistance disposed to check the inward movement of the legs.

9. In a structure of the kind described, a fuselage having transverse bulkheads and slotted sides, branching legs pivotally connected to the bulkheads above the center of gravity of the fuselage and extending through the said slotted sides, a yielding resistance to check the spreading of the legs, and a second yielding resistance to check the inward movement of the legs.

10. An air craft having a fuselage, branching legs having a common pivot connecting them to the fuselage above the center of gravity of the fuselage, and successively acting resistances to check the spreading of the legs.

11. The combination with the fuselage of the branching legs having their upper extremities formed into interlocking knuckles, and a common pivot extending through the knuckles and supported on and above the center of gravity of the fuselage.

In testimony whereof I have signed my name to this specification this 28th day of March, 1927.

EDMUND B. CARNS.